US012181145B2

(12) United States Patent
Laakkio et al.

(10) Patent No.: US 12,181,145 B2
(45) Date of Patent: Dec. 31, 2024

(54) OPTICAL DEVICE

(71) Applicant: LEDIL OY, Salo (FI)

(72) Inventors: Olli-Pekka Laakkio, Turku (FI); Joel Jones, Salo (FI); Veijo Isojunno, Salo (FI)

(73) Assignee: LEDIL OY, Salo (FI)

( * ) Notice: Subject to any disclaimer, the term of this patent is extended or adjusted under 35 U.S.C. 154(b) by 0 days.

(21) Appl. No.: 18/263,493

(22) PCT Filed: Jan. 3, 2022

(86) PCT No.: PCT/FI2022/050002
§ 371 (c)(1),
(2) Date: Jul. 28, 2023

(87) PCT Pub. No.: WO2022/180298
PCT Pub. Date: Sep. 1, 2022

(65) Prior Publication Data
US 2024/0084996 A1 Mar. 14, 2024

(30) Foreign Application Priority Data
Feb. 23, 2021 (FI) ..................................... 20215199

(51) Int. Cl.
*F21V 5/02* (2006.01)
*F21S 4/24* (2016.01)
(Continued)

(52) U.S. Cl.
CPC .................. *F21V 5/02* (2013.01); *F21S 4/24* (2016.01); *F21S 8/04* (2013.01); *F21V 15/013* (2013.01);
(Continued)

(58) Field of Classification Search
CPC ... F21V 5/02; F21V 5/045; F21V 5/00; F21V 15/013; F21S 4/24; F21S 8/04; F21Y 2103/10; F21Y 2115/10
See application file for complete search history.

(56) References Cited

U.S. PATENT DOCUMENTS 4,644,454 A 2/1987 Herst et al.
8,876,348 B2 11/2014 Kelly et al.
(Continued)

FOREIGN PATENT DOCUMENTS

DE 20314606 U1 11/2003
DE 202014101954 U1 7/2015
(Continued)

OTHER PUBLICATIONS

Machine translation of DE 20314606 U1 (Year: 2004).*
(Continued)

*Primary Examiner* — Anne M Hines
*Assistant Examiner* — Jose M Diaz
(74) *Attorney, Agent, or Firm* — NIXON & VANDERHYE

(57) ABSTRACT

An optical device for modifying a light distribution is made of transparent material and includes a front wall constituting a front portion, a coupling portion for connecting to a light source system, and side walls between the coupling portion and the front portion. The front wall is configured to let through a first part of light emitted by the light source, and the side walls are configured to let through a second part of the light. The side walls have grooves that refract at least 80% of the second part of the light obliquely rearwards with respect to a direction from the coupling portion to the front portion. Thus, the optical device can be used for illuminating
(Continued)

both a floor and a ceiling so that light emitted to unwanted directions and potentially causing glare can be kept at a low level.

15 Claims, 3 Drawing Sheets

(51) Int. Cl.

| | |
|---|---|
| ***F21S 8/04*** | (2006.01) |
| ***F21V 15/01*** | (2006.01) |
| ***F21Y 103/10*** | (2016.01) |
| ***F21Y 115/10*** | (2016.01) |

(52) U.S. Cl.
CPC ....... *F21Y 2103/10* (2016.08); *F21Y 2115/10* (2016.08)

(56) References Cited

U.S. PATENT DOCUMENTS

| | | | |
|---|---|---|---|
| 2014/0153282 | A1 | 6/2014 | Ezell et al. |
| 2016/0370533 | A1 | 12/2016 | York et al. |
| 2019/0243146 | A1 | 8/2019 | Chen |
| 2019/0377121 | A1 | 12/2019 | Lerman et al. |

FOREIGN PATENT DOCUMENTS

| | | | |
|---|---|---|---|
| EP | 3460320 | A1 | 3/2019 |
| WO | 2015173025 | A1 | 11/2015 |

OTHER PUBLICATIONS

International Search Report for PCT/FI2022/050002 mailed Apr. 19, 2022, 3 pages.

Finland Search Report for FI20215199 dated Sep. 9, 2021, 2 pages.

Written Opinion of the International Searching Authority for PCT/FI2022/050002 mailed Apr. 19, 2022, 7 pages.

* cited by examiner

OPTICAL DEVICE

CROSS-REFERENCE TO RELATED APPLICATIONS

This application is the U.S. national phase of International Application No. PCT/FI2022/050002 filed Jan. 3, 2022 which designated the U.S. and claims priority to FI 20215199 filed Feb. 23, 2021, the entire contents of each of which are hereby incorporated by reference.

FIELD OF THE DISCLOSURE

The disclosure relates generally to illumination engineering. More particularly, the disclosure relates to an optical device for modifying a distribution of light produced by a light source that may comprise, for example but not necessarily, one or more light emitting diodes "LED". Furthermore, the disclosure relates to a lighting apparatus and to a lighting system.

BACKGROUND

Distribution of light produced by a light source can be important or even critical in some applications. The light source may comprise, for example but not necessarily, one or more light emitting diodes "LED", one or more filament lamps, or one or more gas-discharge lamps. In many office environments, it is desired that light is directed not only towards a floor but towards a ceiling, too. A commonly used solution is to use linear pendant luminaires which have an open top side. A linear pendant luminaire may comprise for example a fluorescent tube or two LED strips facing up and down since LEDs are not omnidirectional.

A known solution to avoid a need for two LED strips is to use a luminaire where light is emitted through side surfaces, too. However, in conjunction with many existing luminaires where light is emitted through side surfaces, a part of the light is emitted obliquely downwards in directions in which the light may cause undesired glare. These existing solutions are typically simple diffusers for aesthetic reasons. Because the emission through the side surfaces may cause glare, there are many limitations concerning positioning of luminaires of the kind mentioned above in a lighting system for illuminating an office. Therefore, there is a need for optical devices for modifying a distribution of light emitted by e.g. a LED strip or another light source, wherein the distribution of light is to be modified so that most of the light is directed downwards to a floor, a smaller part of the light is directed to a ceiling, and light emitted to unwanted directions and potentially causing glare can be kept at a sufficiently low level.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new optical device for modifying a distribution of light produced by a light source.

An optical device according to the invention is made of transparent material, and the optical device comprises:

- a front wall constituting a front portion,
- a coupling portion configured to mechanically connect to a light source system, and
- side walls between the coupling portion and the front portion.

The front wall is configured to let through a first part of light emitted by the light source and the side walls are configured to let through a second part of the light. Surfaces of the side walls are shaped to have grooves to refract at least 80% of the second part of the light obliquely rearwards with respect to a first direction from a geometric center point of the coupling portion to a geometric center point of the front portion. In a typical usage of the optical device, the first direction is downwards. As most of the second part of the light is refracted obliquely rearwards with respect to the above-mentioned first direction, the optical device can be used for illuminating both a floor and a ceiling so that light emitted to unwanted directions and potentially causing glare can be kept at a level low enough.

In accordance with the invention, there is provided also a new lighting apparatus that comprises a light source and an optical device according to the invention for modifying a distribution of light emitted by the light source. The light source may comprise for example one or more light emitting diodes "LED" e.g. a LED strip, one or more filament lamps, or one or more gas-discharge lamps.

In accordance with the invention, there is provided also a new lighting system that comprises a floor and a ceiling to be illuminated and at least one lighting apparatus according to the invention between the floor and the ceiling, wherein the front wall of the optical device of the lighting apparatus is directed towards the floor.

An optical device according to the invention can be manufactured for example by mold casting. In accordance with the invention, there is provided also a new mold having a form suitable for manufacturing, by mold casting, a piece of transparent material, e.g. plastic, having a shape of an optical device according to the invention.

In an exemplifying case where an optical device according to the invention is elongated and suitable for modifying a distribution of light emitted by an elongated light source, e.g. a LED strip, the optical device can be manufactured for example by extruding.

Various exemplifying and non-limiting embodiments are described in accompanied dependent claims.

Exemplifying and non-limiting embodiments both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below with reference to the accompanying drawings, in which.

DESCRIPTION OF EXEMPLIFYING AND NON-LIMITING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
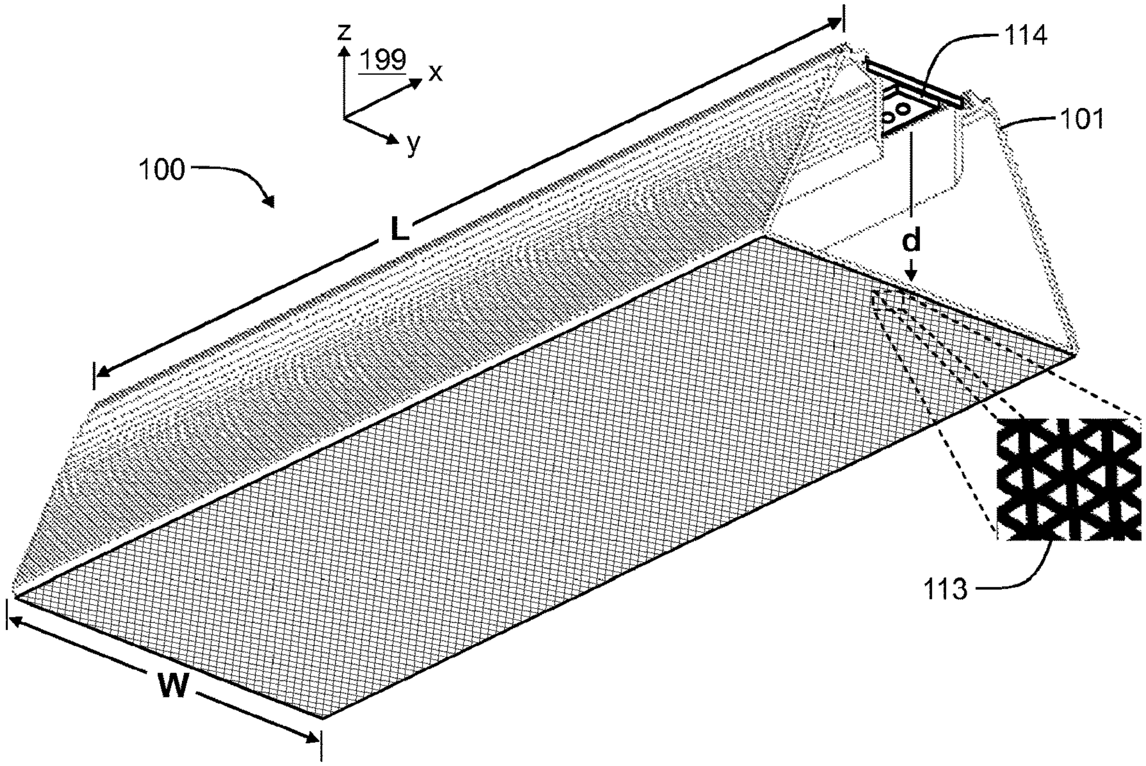
FIGS. 1*a* and 1*b* illustrate a lighting apparatus that comprises an optical device according to an exemplifying and non-limiting embodiment for modifying light distribution.
Figure 1B:
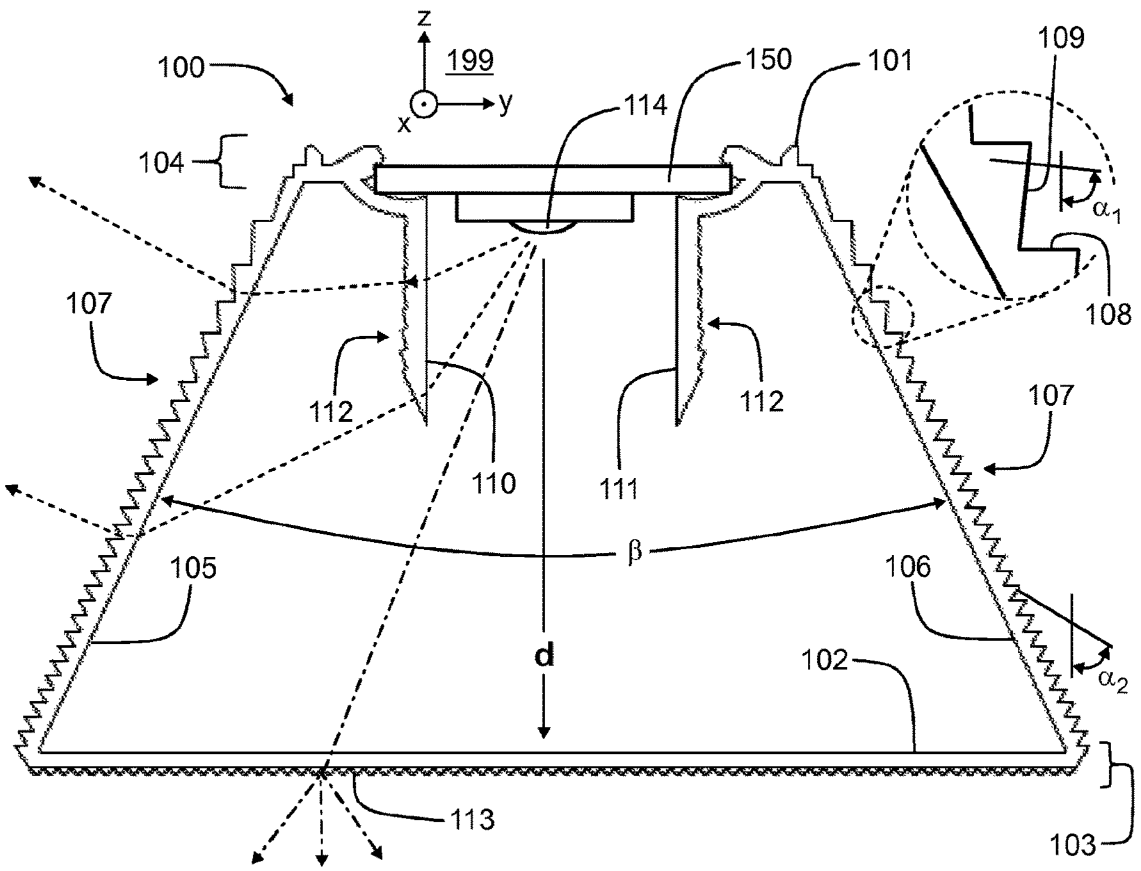

FIG. 1*a* shows an isometric view of a lighting apparatus 100 that comprises a light source 114 and an optical device 101 according to an exemplifying and non-limiting embodiment for modifying a distribution of light emitted by the light source 114. In this exemplifying case, the optical device 101 is elongated so that the length L of the optical device is at least two times the width W of the optical device. The light source 114 can be for example a LED strip or another suitable elongated light source. FIG. 1*b* shows an end-view of the lighting apparatus 100. The viewing directions related to FIGS. 1*a* and 1*b* are illustrated with a coordinate system 199. The optical device 101 is made of transparent material whose refractive index is greater than one. The transparent material can be for example acrylic plastic, polycarbonate, optical silicone, or glass. A method of manufacture of the optical device 101 can be for example mold casting or extruding.

The optical device 101 comprises a front wall 102 that constitutes a front portion 103 of the optical device 101. The optical device 101 comprises a coupling portion 104 configured to mechanically connect to a light source system 150 that comprises the light source 114. The optical device 101 comprises side walls 105 and 106 that are between the coupling portion 104 and the front portion 103 so that the side walls 105 and 106 are connected to edges of the front wall 102. The front wall 102 is configured to let through a first part of the light emitted by the light source 114 and the side walls 105 and 106 are configured to let through a second part of the light. Surfaces of the side walls 105 and 106 are shaped to have grooves 107 that are parallel with the longitudinal direction of the optical device 101, i.e. parallel with the x-axis of the coordinate system 199. The grooves are shaped so that the side walls 105 and 106 refract at least 80%, or at least 85%, or at least 90%, or at least 95%, of the second part of the light obliquely rearwards with respect to a first direction d that is from a geometric center point of the coupling portion 104 to a geometric center point of the front portion 103. In FIGS. 1*a* and 1*b*, the direction d is the negative z-direction of the coordinate system 199. In this exemplifying case, a profile of the optical device 101 is symmetric with respect to a geometric line parallel with the direction d. In FIG. 1*b*, exemplifying light beams belonging to the second part of the light are depicted with dashed line arrows and exemplifying light beams belonging to the first part of the light are depicted with dash-and-dot line arrows. In typical usage of the lighting apparatus 100, the above-mentioned direction d is downwards. As most of the second part of the light is refracted obliquely rearwards with respect to the direction d, the lighting apparatus 100 can be used for illuminating both a floor and a ceiling so that light emitted to unwanted directions and potentially causing glare can be kept at a level low enough.

In the exemplifying optical device 101 illustrated in FIGS. 1*a* and 1*b*, each of the grooves of the side walls 105 and 106 has a first side and a second side. In FIG. 1*b*, one of the first sides of the grooves is denoted with a reference 108 and one of the second sides of the grooves is denoted with a reference 109. The second sides are angled with respect to the direction d so that an angle between the geometric normal of the second side and the direction d is greater in a first one of the grooves that is closer to the coupling portion 104 than in a second one of the grooves that is closer to the front portion 103. Two examples of the above-mentioned angle are denoted with $\alpha_1$ and $\alpha_2$. As shown in FIG. 1*b*, the angle $\alpha_1$ related to a groove that is closer to the coupling portion 104 is greater than the angle $\alpha_2$ related to another groove that is closer to the front portion 103. Therefore, the grooves form a Fresnel-type lens surface that corresponds to a convex lens surface.

In the exemplifying optical device 101 illustrated in FIGS. 1*a* and 1*b*, the grooves are on the outer surfaces of the side walls 105 and 106. It is however also possible that there are grooves on the inner surfaces of the side walls, or that there are grooves on both the outer and inner surfaces of the side walls.

In an optical device according to an exemplifying and non-limiting embodiment, the side walls are angled with respect to each other so that an angle between the side walls opens towards the front wall. The angle can be e.g. in the range from 5 degrees to 75 degrees. In the exemplifying optical device 101 illustrated in FIGS. 1*a* and 1*b*, an angle $\beta$ between the side walls 105 and 106 is about 30 degrees.

The exemplifying optical device 101 illustrated in FIGS. 1*a* and 1*b* comprises auxiliary side walls 110 and 111 that are between the side walls 104 and 106 and are connected to the coupling portion 104. The auxiliary side walls 110 and 111 are directed towards the front portion 103 and are shaped to have grooves 112, or other deviations from a planar shape, to modify a distribution of light falling on the inner surfaces of the side walls 104 and 106. The auxiliary side walls 110 and 111 can be designed e.g. to smoothen the distribution of the light falling on the inner surfaces of the side walls 104 and 106. In the exemplifying optical device 101 illustrated in FIGS. 1*a* and 1*b*, the auxiliary side walls 110 and 111 are parallel with each other but it is also possible that auxiliary side walls are angled with respect to each other.

It is however also possible that an optical device according to an exemplifying and non-limiting embodiment does not comprise auxiliary side walls but, instead, a light source radiates light directly to inner surfaces of the side walls.

In the exemplifying optical device 101 illustrated in FIGS. 1*a* and 1*b*, a surface of the front wall 102 has a pattern of microprisms to smoothen the distribution of light penetrating the front wall 102. In FIGS. 1*a* and 1*b*, one of the microprisms is denoted with a reference 113.

Figure 2:
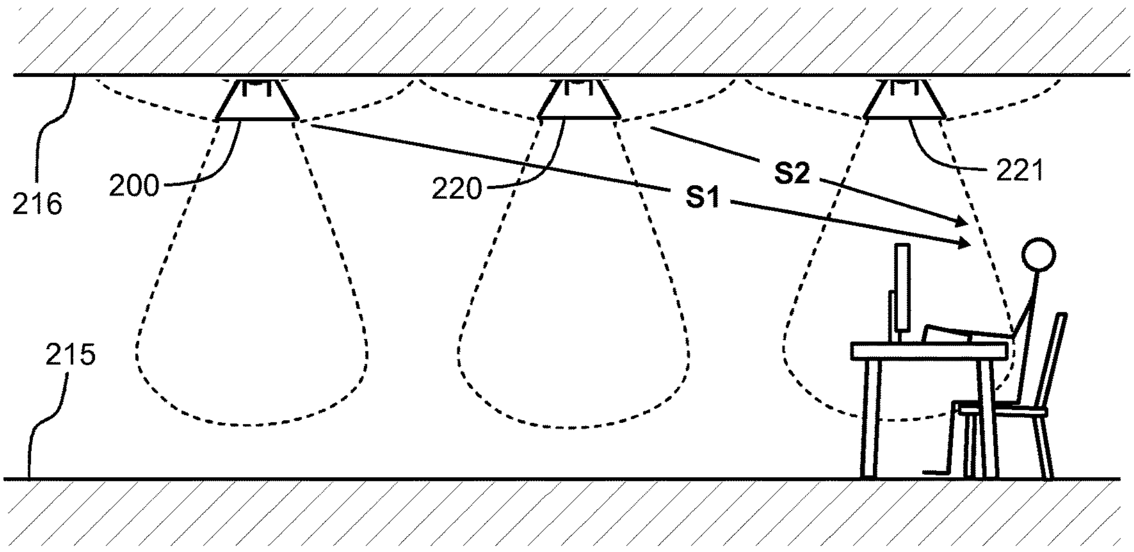
FIG. 2 illustrates a lighting system that comprises lighting apparatuses according to an exemplifying and non-limiting embodiment.

FIG. 2 illustrates a lighting system that comprises a floor 215, a ceiling 216, and lighting apparatuses 200, 220, and 221 between the floor and the ceiling. Each of the lighting apparatuses 200, 220, and 221 comprises an optical device according to an exemplifying and non-limiting embodiment, e.g. such as the optical device 101 illustrated in FIGS. 1*a* and 1*b*. The front wall of the optical device of each lighting apparatus is directed towards the floor 215 to direct a first part of light emitted by the lighting apparatus under consideration to the floor 215 and to direct a second part of the light obliquely to the ceiling 216. The light distribution patterns generated by the lighting apparatuses 200, 220, and 221 are depicted with dashed lines. As shown in FIG. 2, the lighting apparatuses 200, 220, and 221 do not substantially emit light in directions S1 and S2 in which the light would cause harmful glare.

Figure 3:
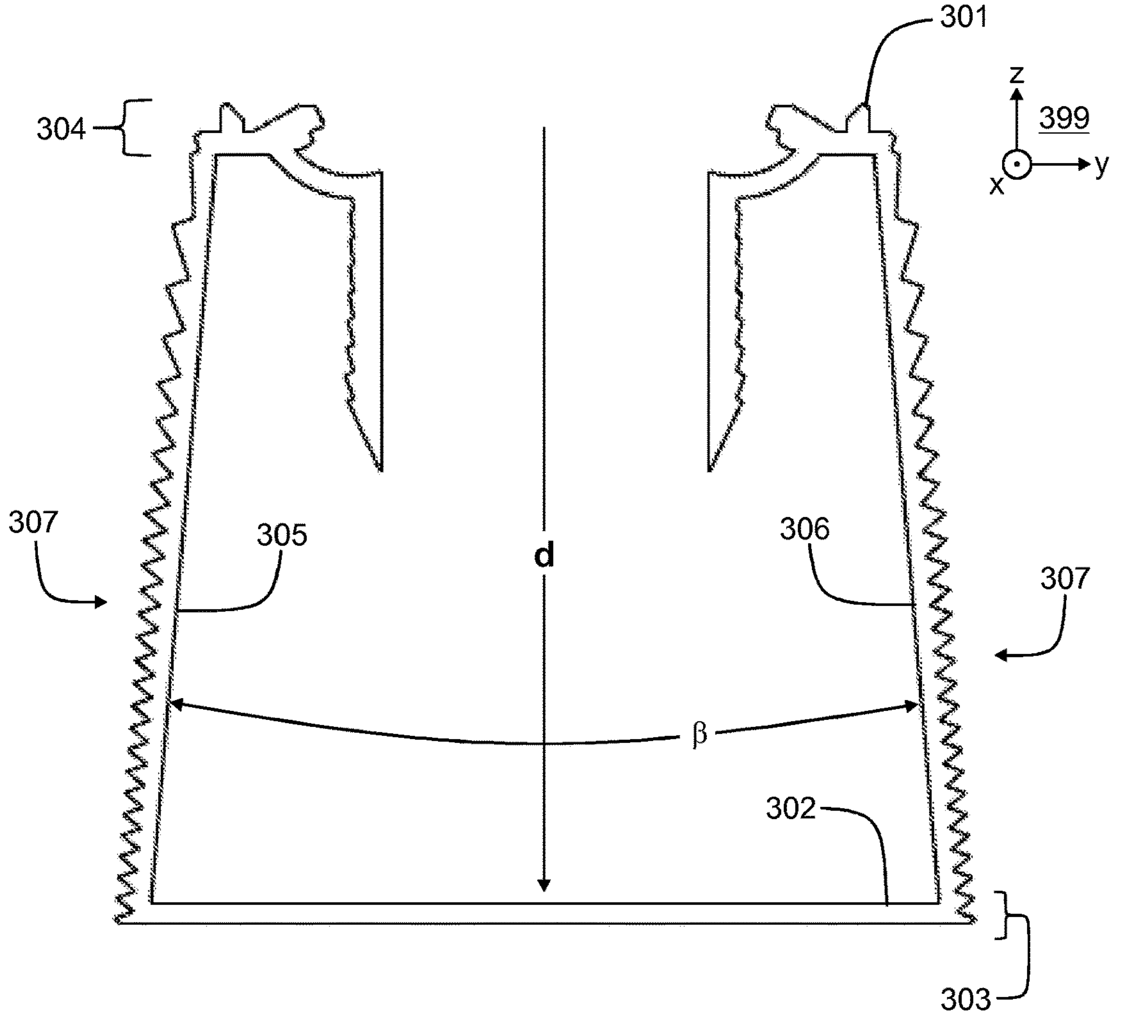
FIG. 3 illustrates an optical device according to an exemplifying and non-limiting embodiment for modifying light distribution.

FIG. 3 illustrates an optical device 301 according to an exemplifying and non-limiting embodiment for modifying a light distribution. The optical device 301 can be elongated like the optical device 101 illustrated in FIGS. 1*a* and 1*b*. It is however also possible that FIG. 3 shows a section view of the optical device and the optical device is rotationally symmetric with respect to a geometric line parallel with the z-axis of a coordinate system 399. The optical device 301 comprises a front wall 302 that constitutes a front portion 303 of the optical device 301. The optical device 301 comprises a coupling portion 304 configured to mechanically connect to a light source system. The optical device 301 comprises side walls 305 and 306 that are between the coupling portion 304 and the front portion 303. The front wall 302 is configured to let through a first part of light emitted by a light source, and the side walls 305 and 306 are configured to let through a second part of the light. Surfaces of the side walls 305 and 306 are shaped to have grooves 307. The grooves are shaped so that the side walls 305 and 306 refract at least 80%, or at least 85%, or at least 90%, or at least 95%, of the second part of the light obliquely rearwards with respect to a first direction d that is from a geometric center point of the coupling portion 304 to a geometric center point of the front portion 303.

In the exemplifying optical device 301 illustrated in FIG. 3, the side walls 305 and 306 are angled with respect to each other so that an angle β between the side walls opens towards the front wall 302. In this exemplifying case, the angle β is about 10 degrees.

Figure 4A:
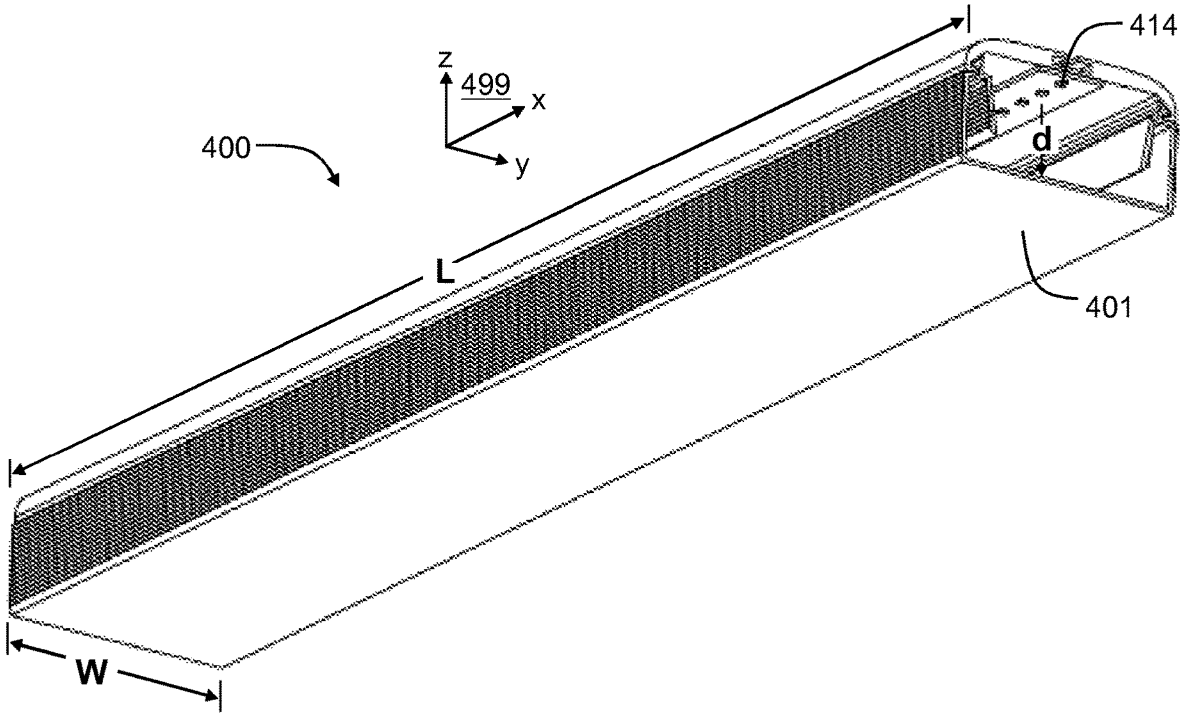
FIGS. 4*a* and 4*b* illustrate a lighting apparatus that comprises an optical device according to an exemplifying and non-limiting embodiment for modifying light distribution.
Figure 4B:
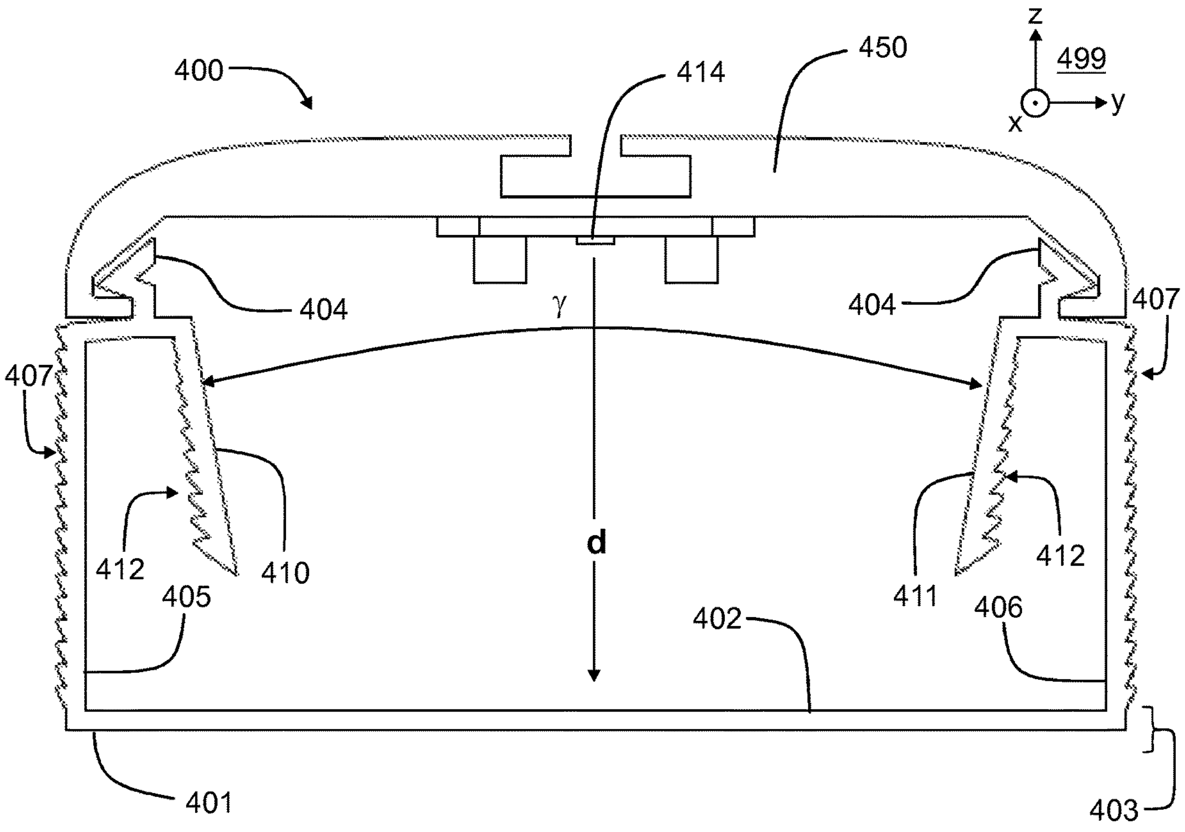

FIG. 4*a* shows an isometric view of a lighting apparatus 400 that comprises a light source 414 and an optical device 401 according to an exemplifying and non-limiting embodiment for modifying a distribution of light emitted by the light source 414. In this exemplifying case, the optical device 401 is elongated so that the length L of the optical device is at least two times the width W of the optical device. FIG. 4*b* shows an end-view of the lighting apparatus 400. The viewing directions related to FIGS. 4*a* and 4*b* are illustrated with a coordinate system 499. The optical device 401 is made of transparent material whose refractive index is greater than one.

The optical device 401 comprises a front wall 402 that constitutes a front portion 403 of the optical device 401. The optical device 401 comprises a coupling portion 404 configured to mechanically connect to a light source system 450 that comprises the light source 414. The optical device 401 comprises side walls 405 and 406 that are between the coupling portion 404 and the front portion 403 so that the side walls 405 and 406 are connected to edges of the front wall 402. The front wall 402 is configured to let through a first part of the light emitted by the light source 414 and the side walls 405 and 406 are configured to let through a second part of the light. Surfaces of the side walls 405 and 406 are shaped to have grooves 407 that are parallel with the longitudinal direction of the optical device 401, i.e. parallel with the x-axis of the coordinate system 499. The grooves are shaped so that the side walls 405 and 406 refract at least 80%, or at least 85%, or at least 90%, or at least 95%, of the second part of the light obliquely rearwards with respect to a first direction d that is from a geometric center point of the coupling portion 404 to a geometric center point of the front portion 403. In FIGS. 4*a* and 4*b*, the direction d is the negative z-direction of the coordinate system 499. In a typical usage of the lighting apparatus 400, the above-mentioned direction d is downwards. As most of the second part of the light is refracted obliquely rearwards with respect to the direction d, the lighting apparatus 400 can be used for illuminating both a floor and a ceiling so that light emitted to unwanted directions and potentially causing glare can be kept at a level low enough.

In the exemplifying optical device 401 illustrated in FIGS. 4*a* and 4*b*, the grooves are on the outer surfaces of the side walls 405 and 406. It is however also possible that there are grooves on the inner surfaces of the side walls, or that there are grooves on both the outer and inner surfaces of the side walls.

The exemplifying optical device 401 illustrated in FIGS. 4*a* and 4*b* comprises auxiliary side walls 410 and 411 that are between the side walls 404 and 406 and are connected to the coupling portion 404. The auxiliary side walls 410 and 411 are directed towards the front portion 403 and are shaped to have grooves 412, or other deviations from a planar shape, to modify a distribution of light falling on the inner surfaces of the side walls 404 and 406. The auxiliary side walls 410 and 411 can be designed e.g. to smoothen the distribution of the light falling on the inner surfaces of the side walls 404 and 406. In the exemplifying optical device 401 illustrated in FIGS. 4*a* and 4*b*, the auxiliary side walls 410 and 411 are angled with respect each other so that the angle γ between the auxiliary side walls 410 and 411 opens towards the light source 414. The angle γ can be in the range from e.g. 5 degrees to e.g. 20 degrees. It is also possible that an optical device according to an exemplifying and non-limiting embodiment does not comprise auxiliary side walls but, instead, a light source radiates light directly to inner surfaces of the side walls.

The specific examples provided in the description given above should not be construed as limiting the scope and/or the applicability of the appended claims. Lists and groups of examples provided in the description given above are not exhaustive unless otherwise explicitly stated.

What is claimed is:

1. An optical device being made of transparent material and comprising:

a front wall constituting a front portion, a coupling portion configured to mechanically connect to a light source system, and side walls between the coupling portion and the front portion, wherein the front wall is configured to let through a first part of light emitted by the light source system and the side walls are configured to let through a second part of the light, and surfaces of the side walls are shaped to have grooves to refract at least 80% of the second part of the light obliquely rearwards with respect to a first direction from a geometric center point of the coupling portion to a geometric center point of the front portion, and wherein each of the grooves has a first side and a second side, the second side being angled with respect to the first direction so that an angle between a geometric normal of the second side and the first direction is greater in a first one of the grooves that is closer to the coupling portion than in a second one of the grooves that is closer to the front portion.

2. The optical device according to claim 1, wherein the surfaces of the side walls having the grooves are outer surfaces of the side walls.

3. The optical device according to claim 1, wherein the side walls are angled with respect to each other so that an angle between the side walls opens towards the front wall.

4. The optical device according to claim 3, wherein the angle is in a range from 5 degrees to 75 degrees.

5. The optical device according to claim 1, wherein the optical device comprises auxiliary side walls between the side walls and connected to the coupling portion, the auxiliary side walls being directed towards the front portion and being shaped to have deviations from a planar shape to modify a distribution of the second part of the light penetrating the auxiliary side walls and falling on inner surfaces of the side walls.

6. The optical device according to claim 5, wherein the auxiliary side walls are parallel with each other.

7. The optical device according to claim 5, wherein the auxiliary side walls are angled with respect each other so that an angle between the auxiliary side walls opens towards the light source.

8. The optical device according to claim 1, wherein the optical device is elongated so that a length of the optical device is at least two times a width of the optical device, the grooves of the side walls being parallel with a longitudinal direction of the optical device.

9. The optical device according to claim 1, wherein a surface of the front wall has a pattern of microprisms to smoothen the distribution of the first part of the light.

10. The optical device according to claim 9, wherein the surface of the front wall having the pattern of microprisms is an outer surface of the front wall.

11. The optical device according to claim 1, wherein the transparent material is one of the following: acrylic plastic, polycarbonate, optical silicone, or glass.

12. A lighting apparatus comprising a light source system and an optical device being made of transparent material and comprising:

a front wall constituting a front portion, a coupling portion configured to mechanically connect to the light source system, and side walls between the coupling portion and the front portion, wherein the front wall is configured to let through a first part of light emitted by the light source system and the side walls are configured to let through a second part of the light, and surfaces of the side walls are shaped to have grooves to refract at least 80% of the second part of the light obliquely rearwards with respect to a first direction from a geometric center point of the coupling portion to a geometric center point of the front portion, and wherein each of the grooves has a first side and a second side, the second side being angled with respect to the first direction so that an angle between a geometric normal of the second side and the first direction is greater in a first one of the grooves that is closer to the coupling portion than in a second one of the grooves that is closer to the front portion, the light source system comprising a light source and being positioned at the coupling portion of the optical device.

13. A lighting system comprising a floor and a ceiling to be illuminated and at least one lighting apparatus between the floor and the ceiling, the lighting apparatus comprising a light source system and an optical device being made of transparent material and comprising:

a front wall constituting a front portion, a coupling portion configured to mechanically connect to the light source system, and side walls between the coupling portion and the front portion, wherein the front wall is configured to let through a first part of light emitted by the light source system and the side walls are configured to let through a second part of the light, and surfaces of the side walls are shaped to have grooves to refract at least 80% of the second part of the light obliquely rearwards with respect to a first direction from a geometric center point of the coupling portion to a geometric center point of the front portion, and wherein each of the grooves has a first side and a second side, the second side being angled with respect to the first direction so that an angle between a geometric normal of the second side and the first direction is greater in a first one of the grooves that is closer to the coupling portion than in a second one of the grooves that is closer to the front portion, the light source system comprising a light source and being positioned at the coupling portion of the optical device, wherein the front wall of the optical device of the lighting apparatus is directed towards the floor.

14. A mold having a form suitable for manufacturing, by mold casting, a transparent piece constituting an optical device according to claim 1.

15. The optical device according to claim 2, wherein the side walls are angled with respect to each other so that an angle between the side walls opens towards the front wall.

* * * * *